L. F. JOHNSTON.
Transplanter.
No. 206,576. Patented July 30, 1878.
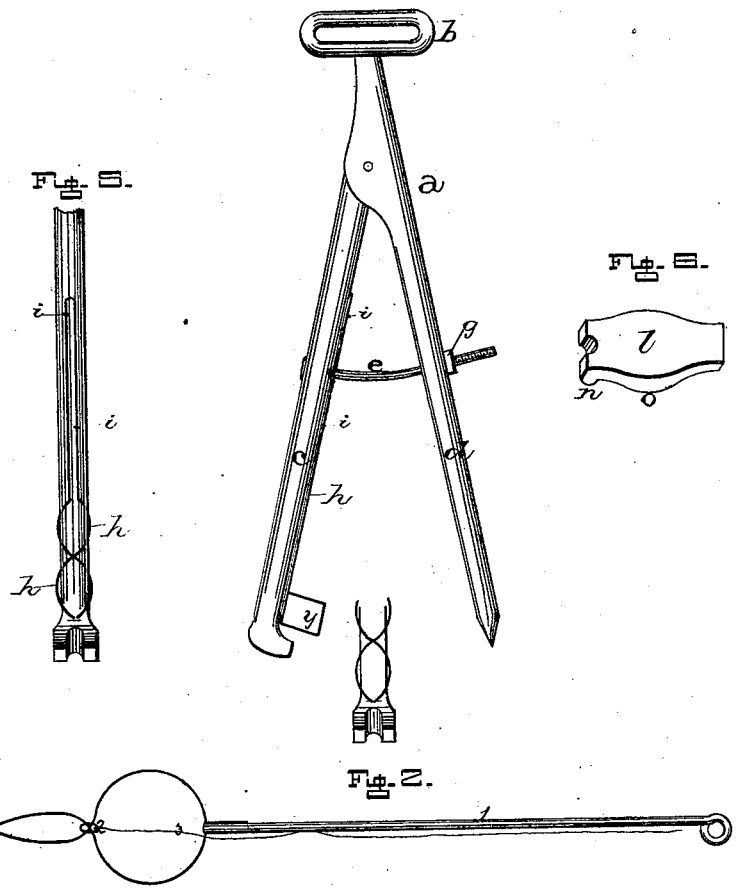
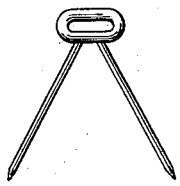
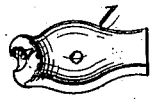
WITNESSES.
J. B. Garner
W. S. D. Haines
INVENTOR
L. F. Johnston,
per
F. A. Lehmann,
atty

UNITED STATES PATENT OFFICE.

LARKIN F. JOHNSTON, OF POCAHONTAS, ARKANSAS.

IMPROVEMENT IN TRANSPLANTERS.

Specification forming part of Letters Patent No. 206,576, dated July 30, 1878; application filed February 9, 1878.

*To all whom it may concern:*

Be it known that I, LARKIN F. JOHNSTON, of Pocahontas, in the county of Randolph and State of Arkansas, have invented certain new and useful Improvements in Planters and Transplanters; and I do hereby declare the following to be a full, clear, and exact description of the invention, such as will enable others skilled in the art to which it pertains to make and use it, reference being had to the accompanying drawings, which form part of this specification.

My invention relates to an improvement in planters and transplanters; and it consists in the arrangement and combination of parts, whereby plants can be transplanted with great rapidity and ease, without fatigue to the operator of constantly bending down, as will be more fully described hereinafter.

Figure 1 is a side elevation of my invention. Figs. 2 and 3 are modifications of the same. Figs. 4 and 6 are views of the sandal. Fig. 5 is a detail view.

$a$ represents the transplanter, which is provided with the handle $b$ to carry it by, and with the two prongs, $c$ $d$, the prong $c$ being pivoted at its upper end, so as to be movable back and forth. The lower end of the prong $d$ is made sharp-pointed, for the purpose of making holes, into which the plants are set, while the lower ends of the prong $c$ is much enlarged, as shown, and bifurcated upon the inner side, so as to form a recess, support, or guide to receive the plant as it is being set in the hole made for it. The distance between the lower ends of these two prongs is regulated by the curved rod $e$, which may have a screw cut upon it, and have a regulating-nut, $g$; or a thumb-screw may be passed through the side of the prong and clamp it. By having two prongs they may be used like a compass, and thus the distance between each plant be regulated with absolute precision.

Loosely attached to the inside of the pivoted prong, by suitable keepers $i$, so that it can be adjusted up and down, are the spring-tongs $h$, by which the plant is held while being put in its hole. The legs of these tongs are made of elastic material, and cross each other, as shown, so that their lower ends will grasp and gently hold any plant that may be placed between them, the said ends $y$ being properly shaped for this purpose. When desired, a ring may be passed up over one leg, so as to bear against both of them where they cross, just above their lower ends, and then a string be fastened to this ring, which will run up to the hand. By pulling upon this ring the lower ends of the jaw will be forced apart, and thus be made to drop the plant between them without any further effort on the part of the operator.

After a hole has been made for a plant with the sharp-pointed prong $d$ the operator takes a plant from a bag, satchel, or basket suspended from his shoulder, and, turning the transplanter up to a horizontal position, inserts the plant between the ends of the tongs, so that its roots will hang downward between and below the bifurcated end of the prong $c$ a sufficient distance to be inserted in the hole. The operator then presses downward upon the prong $c$, when the peculiar shape of the end of the prong presses the earth toward and around three sides of the plant. The pressure of the tongs upon the plant being very light, as the prong $c$ is pressed downward the ends of the tongs will come in contact with the earth, and as the prong $c$ is forced downward into the earth the tongs will rise slightly upward, gradually releasing its hold upon the plant, until, when the plant is set, the tongs can be pulled off without disturbing it.

In order to press the earth solidly around the plants, the operator uses a piece of board, $l$, which is fastened to one foot, like a sandal, and which is made thickest at $o$, and has a rib or flange, $n$, formed around the notch in its front end. By pressing downward and slightly forward upon this sandal, when the front end is placed near the plant, the earth will be pressed firmly and solidly around the plant.

Should it not be desired to unite the tongs and transplanter in a single implement, as above described, the tongs will be provided with a handle, 1, the ring 2, and cord 3. The device for making the holes for the plants will be made like a compass, and the notch in the front end of the sandal will serve as a guide in directing the plant to its hole. When the devices are thus made separate the sandal is much more necessary than when they are combined together, for the enlarged bifurcated end of the prong $c$ takes its place to a great extent.

By means of a transplanter as above described plants of all kinds can be transplanted with great rapidity, and, as no bending down is necessary, with great ease to the operator.

Having thus described my invention, I claim—

A transplanter consisting of the prong $d$ for making holes, the prong $c$, provided with a covering-foot, and a rod, $e$, for adjusting the distance between the hills, in combination with the tongs $h$, substantially as shown.

In testimony that I claim the foregoing I have hereunto set my hand this 21st day of January, 1878.

LARKIN FARLEY JOHNSTON.

Witnesses:
    ALEXANDER R. OVERBEY,
    WILLISTON BATES.